US009909847B1

(12) United States Patent
Burke et al.

(10) Patent No.: US 9,909,847 B1
(45) Date of Patent: Mar. 6, 2018

(54) DISPOSABLE, MINIATURE INTERNAL OPTICAL IGNITION SOURCE

(71) Applicant: The United States of America as Represented by the Secretary of the Army, Washington, DC (US)

(72) Inventors: Gregory Burke, Piermont, NH (US); John Hirlinger, Hackettstown, NJ (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 0 days.

(21) Appl. No.: 15/332,422

(22) Filed: Oct. 24, 2016

Related U.S. Application Data

(63) Continuation of application No. 15/007,575, filed on Jan. 27, 2016, now Pat. No. 9,618,307, which is a continuation-in-part of application No. 14/219,519, filed on Mar. 19, 2014, now Pat. No. 9,273,942.

(60) Provisional application No. 61/806,086, filed on Mar. 28, 2013.

(51) Int. Cl.
| | |
|---|---|
| *F42B 5/08* | (2006.01) |
| *F42C 19/08* | (2006.01) |
| *F42B 5/28* | (2006.01) |

(52) U.S. Cl.
CPC ............... *F42B 5/08* (2013.01); *F42B 5/28* (2013.01); *F42C 19/0823* (2013.01)

(58) Field of Classification Search
CPC ...... F42C 19/0823; B23K 1/0016; F42B 5/08; F42B 5/28; F42B 3/13; F42B 3/124; F42B 3/103

USPC .............................................. 102/202.5, 472
See application file for complete search history.

(56) References Cited

U.S. PATENT DOCUMENTS

| | | | | |
|---|---|---|---|---|
| 3,022,446 A * | 2/1962 | Irish, Jr. | ................... | F42B 3/18 |
| | | | | 102/202.5 |
| 3,685,392 A * | 8/1972 | Platt | ...................... | F42B 3/113 |
| | | | | 102/201 |
| 4,619,202 A * | 10/1986 | Romer | ..................... | F42B 5/02 |
| | | | | 102/443 |
| 5,206,455 A * | 4/1993 | Williams | ............... | F42B 3/113 |
| | | | | 102/201 |
| 5,421,264 A * | 6/1995 | Petrick | ..................... | F42B 5/08 |
| | | | | 102/201 |
| 9,273,942 B1 * | 3/2016 | Burke | ...................... | F42B 5/08 |

* cited by examiner

*Primary Examiner* — Samir Abdosh
(74) *Attorney, Agent, or Firm* — John P. DiScala

(57) ABSTRACT

An ammunition cartridge for a gun is optically initiated by a mechanism wholly within the cartridge case itself. The case has as optical primer initiation means producing light fluence to ignite a primer, which ignited primer may in turn ignite into a flashtube, and which ignited flashtube may in turn ignite a bed of propellant in said cartridge. The optical primer initiation means may be an LED, a laser diode, a VCSEL, or some other light emitting device in general. The cartridge optically initiated primer package is so sized and made electrically and mechanically seamlessly physically compatible with current ammunition cartridges such that these new cartridges are completely interchangeable. If the cartridge primer initiation means is of a percussion type, the cartridge is adapted to include an in-line piezoelectric crystal so that electrical power will be generated when the cartridge assembly is struck by a firing pin during percussion type operations; the power is then used to initiate the light emitting device.

6 Claims, 12 Drawing Sheets

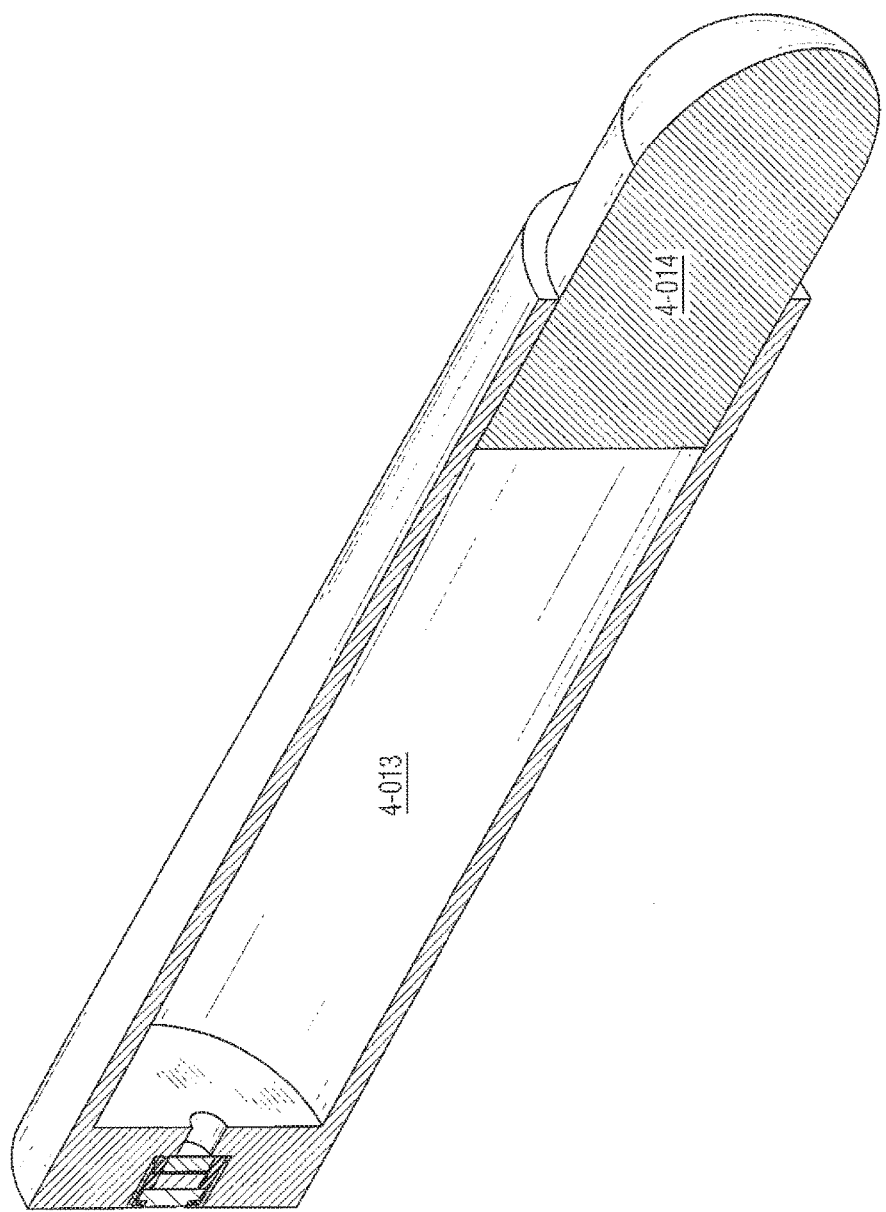

DISPOSABLE, MINIATURE INTERNAL OPTICAL IGNITION SOURCE

CROSS REFERENCE TO RELATED APPLICATIONS

This application is a continuation of U.S. patent application 15/007,575 filed on Jan. 27, 2016 which is a continuation-in-part of U.S. patent application 14/219,519 which claims benefit of provisional application 61/806,086 filed Mar. 28, 2013, the entire file wrapper contents of which application are hereby incorporated by reference as if set forth at length.

FEDERAL RESEARCH STATEMENT

The invention described herein may be manufactured, used, and licensed by or for the U.S. Government for U.S. Government purposes.

BACKGROUND OF INVENTION

Field of the Invention

This invention relates generally to the field of the ignition of small, medium and large caliber munitions and specifically to the use of an optical source (laser or other light emitting source) contained within the base of each cartridge case in place of the traditional chemical primer.

Related Art

Most conventional cartridge systems are initiated by use of a center fire based primer within a metal casing. Such primers are typically initiated through electrical, mechanical or optical means. These systems in particular are used in many small, medium and large caliber gun systems. Recently, advanced artillery systems have explored the use of laser ignition systems wherein the propelling charge is ignited by a laser emitter located in the breech of the artillery system.

As can be appreciated, locating a laser ignition system in the breech of an artillery system presents numerous challenges. Among the most difficult of these challenges are those related to making the laser ignition system sufficiently robust to endure the continuous extreme vibration, shock and thermal excursions produced by the weapon system when fired, as well as the extreme environmental conditions such as long term storage and operation in hot or cold and wet or dry weather conditions.

SUMMARY OF INVENTION

The above problems are solved and an advance is made in the art according to the principles of the present invention. The availability of low cost optical emission sources such as laser diodes, vertical cavity surface emitting lasers (VCSEL's) and light emitting diodes (LED's) allow for the insertion of an active optical source directly within the body of the cartridge. This technology approach is diametrically opposed to current and past efforts of using a single, external laser to initiate the propelling charge and/or cartridge.

Viewed from a first aspect—the present invention is directed to the use of a light emitting source. For technical clarity, the term 'laser diode' will be used, though, any optical source with sufficient output energy could be substituted. Laser diodes are inherently robust, compact and readily available from multiple sources.

Viewed from another aspect—the present invention is directed to the use of a traditional metallic cartridge made of brass, steel or aluminum. This cartridge currently consists of three major components: a primer used to initiate the propellant either directly or via a booster charge, a propelling charge whose products of combustion are used to accelerate a projectile, and the projectile which is the mass discharged by the weapon. Advantageously—and in sharp contrast to previous laser ignition based systems, the proposed invention incorporates an optical based ignition source into and within the confines of cartridge case of munitions similar to present electrical or percussion-based system.

The incorporation of a diode laser within the physical confines of the primer geometry permits a seamless interchangeability and dynamic substitution of both optical and electrical based cartridges with no modification to existing weapon platforms. For systems using electrical ignition sources, a power source is already available, and the laser diode located within the cartridge casing will make use of this source. Alternatively, for weapon systems which use a mechanical firing pin, a diode laser would be coupled with a piezoelectric cell to convert mechanical energy into electrical energy to drive the optical source.

In addition, an optically based igniter integrated within the individual cartridge can be used with environmentally friendly based 'green' primary energetic compounds and would eliminate the need for lead styphnate based mixes with these cartridges.

Of principal relevance is the inherent dual protection by the principle of a Faraday cage which is provided by both the primary exterior metallic cartridge case in combination with the secondary metallic primer housing.

The primary Faraday cage is provided by the exterior case and projectile provides significant protection from electromagnetic environmental effect or $E^3$. A secondary Faraday cage is provided by the primer assembly which completely surrounds the light emitting source. These two features effectively shield the laser diode from electrostatic discharge (ESD) which significantly reduces risk of inadvertent initiation.

Of further advantage is reduction of the threat of inadvertent ignition of the munitions from stray or directed energy fields. Laser diodes, by nature, do not emit optical energy when exposed to high intensity radio frequency fields (RFF). The reduction of sensitivity being primarily the result of the nature of laser diodes to not lase under exposure to high intensity radio frequency fields (RFI). This protection is further enhanced through the reduction and/or elimination of wire leads from the assembly. The principal role of the micro electric circuit design would feature to also provide protection to prevent such damage. Should a laser diode fail, it would fail 'safe', rendering the cartridge inoperable and would be safely ejected with no damage to the weapon platform.

Of further advantage is the reduction of the threat of inadvertent ignition of the munitions from an electro-magnetic pulse (EMP). This reduction in sensitivity is primarily the result of the optical source being contained within multiple Faraday cages and the lack of a suitable antenna.

The insertion of a laser diode based primer assembly/ignition system into the cartridge case presents minimal technical challenges and can be inserted with only minor modification to fabrication and assembly equipment. The elimination of inadvertent ignition by ESD would reduce the risk to manufacturing, transportation, storage and use of munitions of this type. The substitution does not affect the weight, performance, form, fit or function of existing weapon hardware.

BRIEF DESCRIPTION OF THE DRAWINGS

The accompanying figures further illustrate the present invention.

The components in the drawings are not necessarily drawn to scale, emphasis instead being placed upon clearly illustrating the principles of the present invention. In the drawings, like reference numerals designate corresponding parts throughout the several views.

FIG. 4a is a cross sectional view of a fully assembled optical primer based cartridge case containing the exterior case, projectile, propellant, and optical igniter assembly.

DETAILED DESCRIPTION

The following merely illustrates the principles of the invention. It will thus be appreciated that those skilled in the art will be able to devise various arrangements which, although not explicitly described or shown herein, embody the principles of the invention and are included within its spirit and scope.

Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Figure 1:
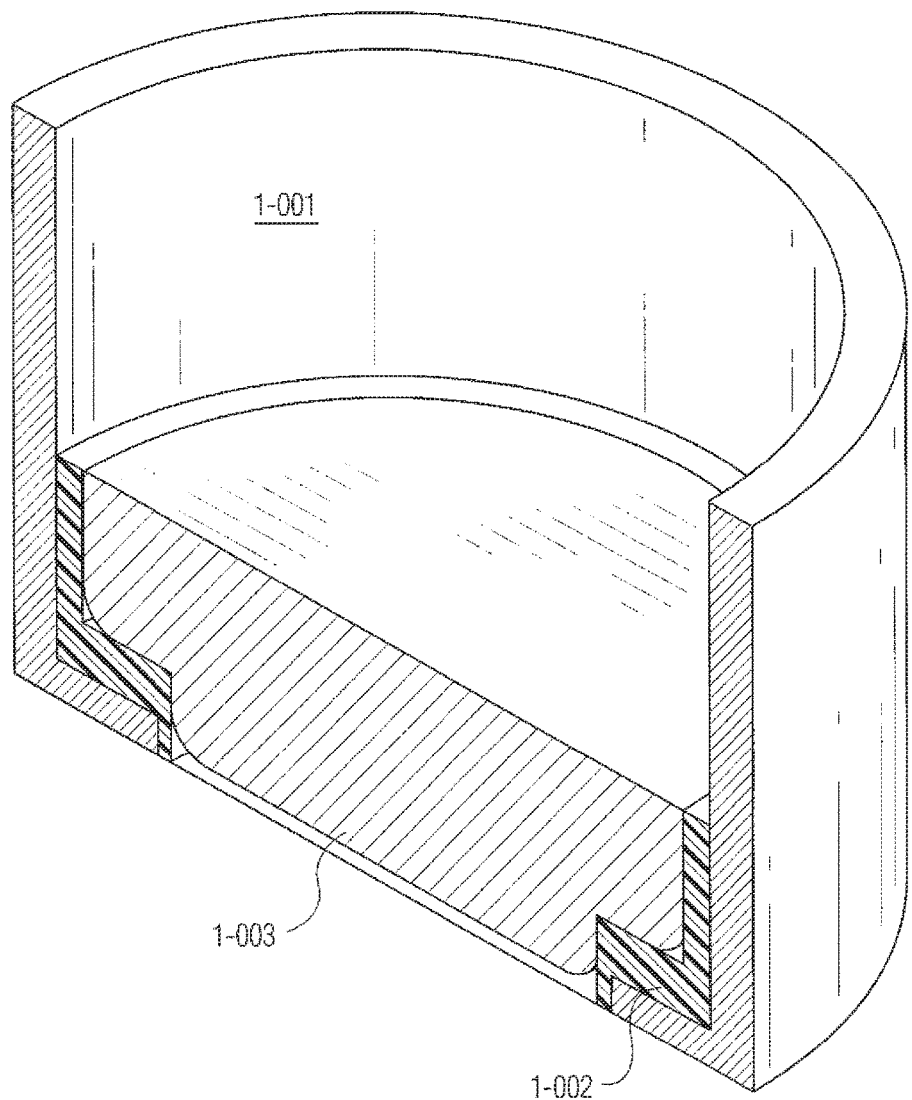
FIG. 1 is a sectional perspective view of a standard primer sans energetics.

In accordance with one preferred embodiment of this invention reference is made to FIG. 1, which shows an external view of a standard primer cup usually made of brass or other conductive material. More particularly, one may observe the brass primer cup 1-001, a generally hollow tube structure, the insulator/seal 1-002 and the conductive button 1-003, usually made of brass or other conductive material 1-003. The reader will note that these are assembled in a conventional manner by pressing the various components together.

Figure 2A:
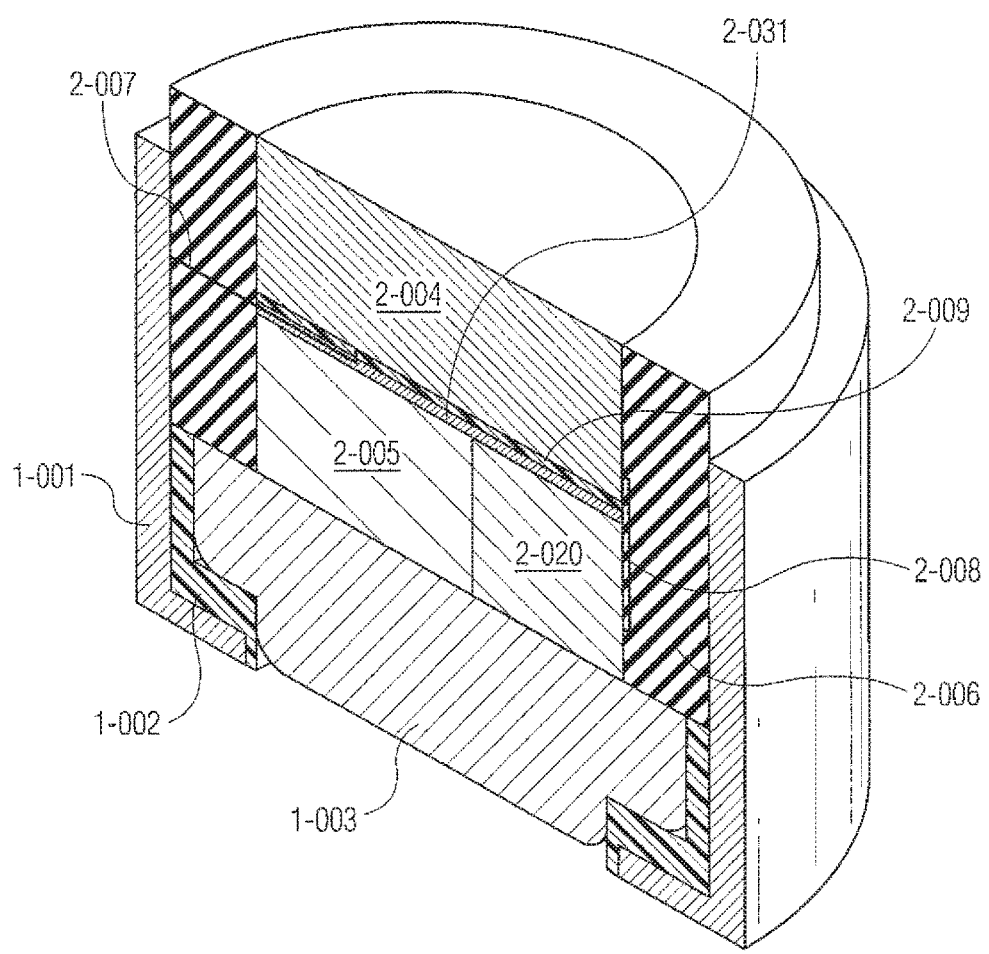
FIG. 2A is a sectional perspective view of a diode laser assembly as proposed mounted within the confines of the standard primer cup from FIG. 1 according to the present invention.
Figure 2B:
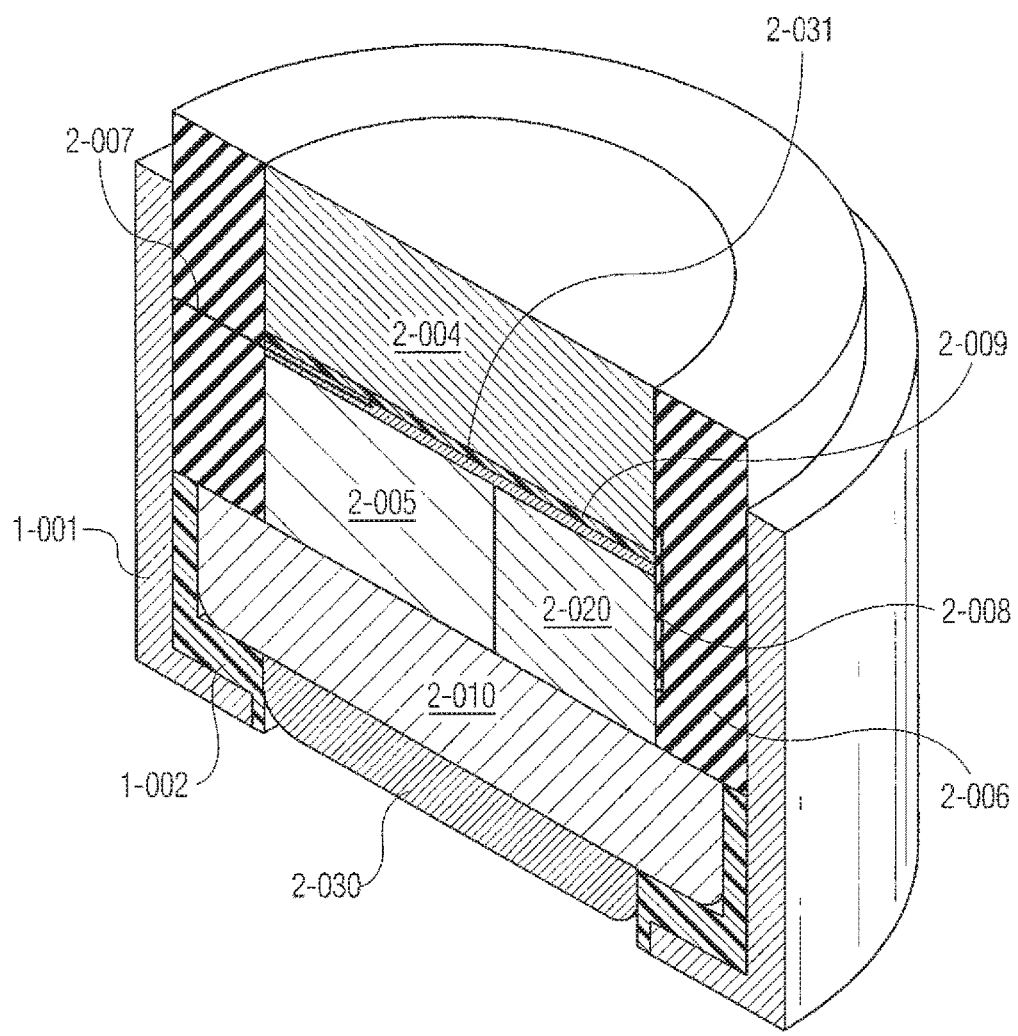
FIG. 2B is a sectional perspective view of a diode laser assembly when percussion by a firing pin, e.g., starts the ignition process, as proposed mounted within the confines of the standard primer cup from FIG. 1 according to the present invention.

FIG. 2A depicts an artistic conception of the installation of the laser diode, microelectronics package, and dielectric materials within the embodiments as described in FIG. 1. The laser diode 2-004 is mounted and positioned above the microelectronics assembly 2-005, both of which rest on top of the conductive button 1-003. The microelectronics package may be soldered directly to the conductive button 1-003. FIG. 2B shows a cup assembly for a percussion type round, where 2-030 is struck by a firing pin, e.g., and causes a piezoelectric crystal type device 2-010 to generate an electrical signal, thereafter to power the microelectronics 2-005 and etc., thence in turn to power the laser diode 2-004, and so forth.

Upon detailed inspection of FIGS. 2A and 2B, the reader will note that the laser diode 2-004, microelectronics assembly 2-005 with ESD mitigation microelectronics added too, and dielectric insulators 2-031 / and spacers 2-009 (either or both where required) are hermetically potted within a dielectric agent such as epoxy 2-006. This feature may be extended in FIG. 2A to particularly encapsulate the conductive button 1-003; thereby eliminating the need for a separate insulator 1-002 in FIG. 2A.

Continuing in FIGS. 2A and 2B, the reader will note the two electrical leads 2-007 and 2-008 connecting the laser diode to the primer cup 1-001 and the microelectronics package 2-005 to the laser diode 2-004 respectively. Dielectric insulators 2-031/and spacers 2-009 as shown may either or both be required.

Figure 3A:
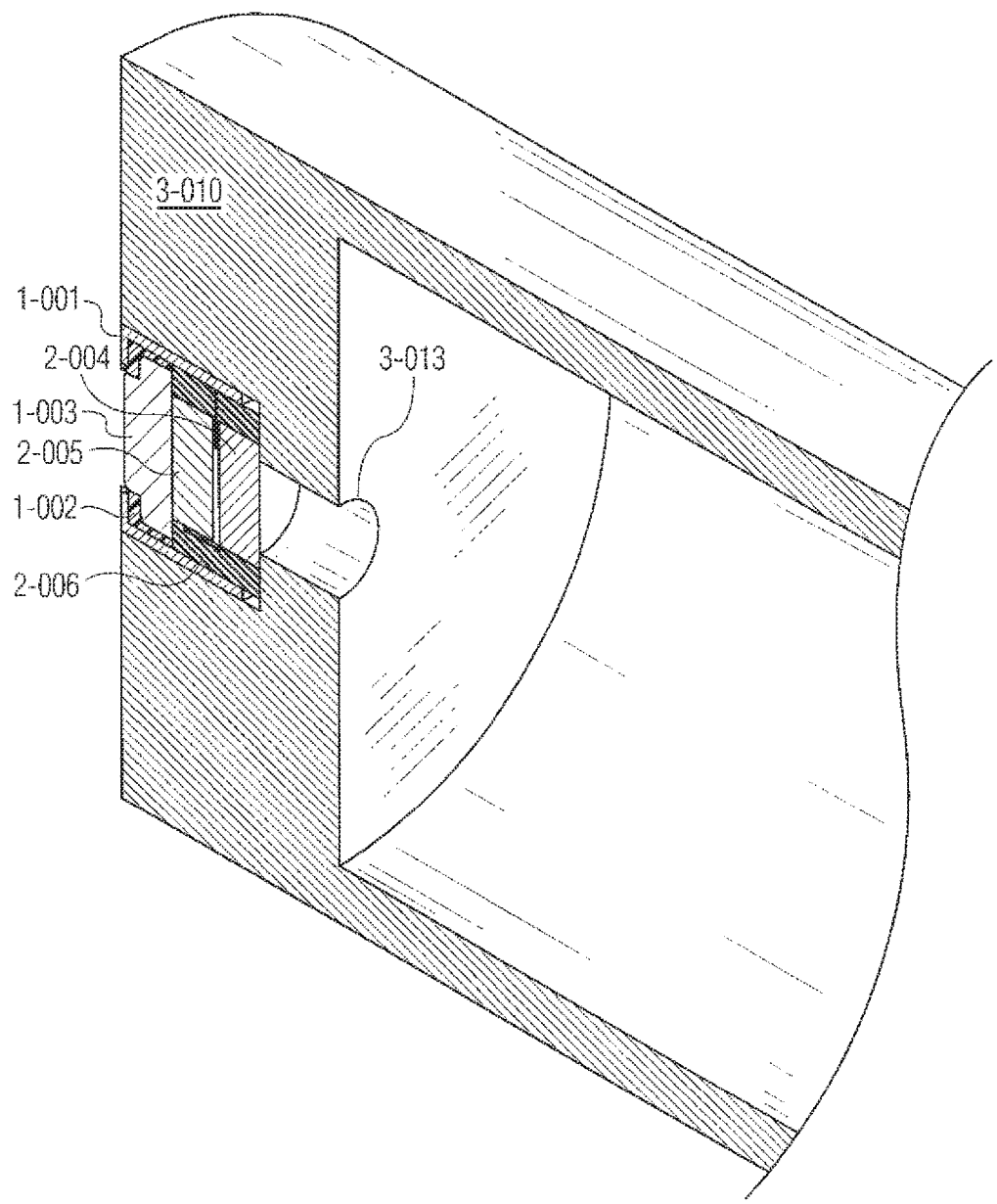
FIG. 3a is a cut away of a fully assembled optically based igniter according to the present invention located within a standard cartridge munitions without a booster mechanism, i.e. flash tube.

FIG. 3a depicts a complete optical igniter assembly which includes all of the embodiments of FIG. 2A as well as illustrates its location within a cartridge case 3-010. This demonstrates an example where the optical igniter directly ignites the propellant, and sometimes it is done through a channel 3-013.

Figure 3B:
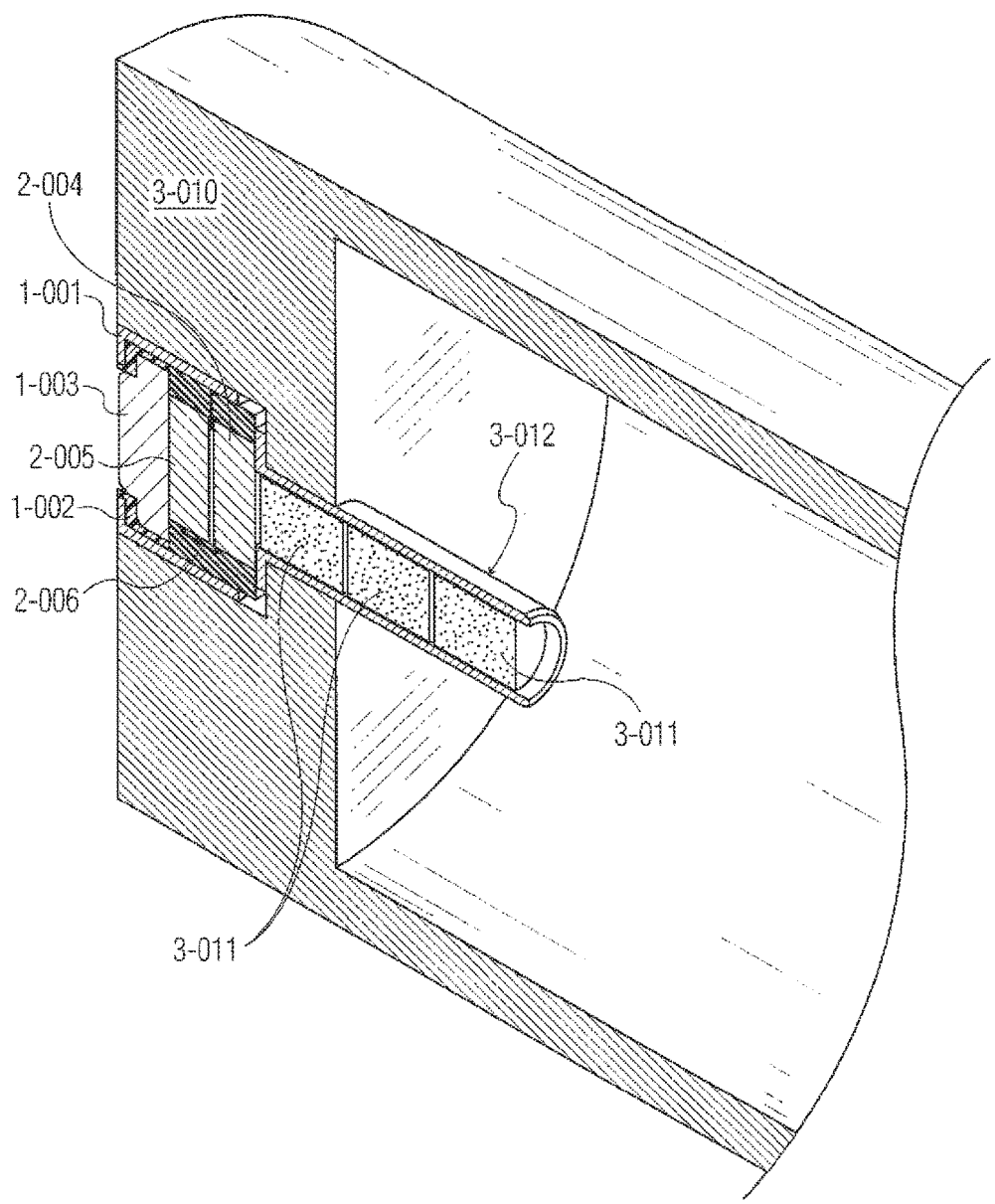
FIG. 3b is a cut away of a fully assembled optically based primer according to the present invention located within a standard cartridge munition which utilizes a booster mechanism, i.e. a flash tube.

FIG. 3b depicts a complete optical primer assembly which includes the embodiment(s) of FIG. 2A and illustrates a potential location (cartoon) for various energetic materials within a cartridge case 3-010, where energetic pellets or gas generators 3-011 are used with a flash tube 3-012 to ignite the propellant.

FIG. 4a depicts the complete assembly from FIG. 3a complete with propellant 4-013 and a projectile 4-014 in place.

Figure 4B:
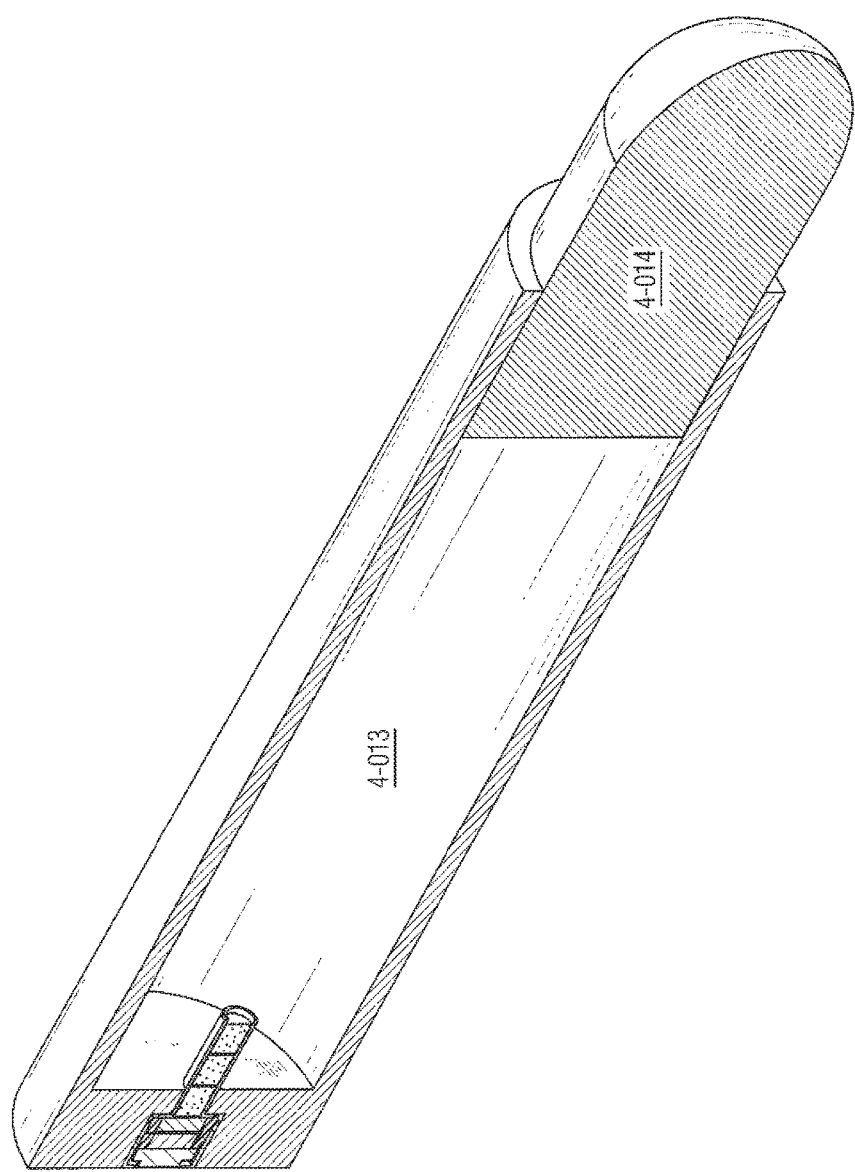
FIG. 4b is a cross sectional view of a fully assembled optical primer based cartridge case containing the exterior case, projectile, propellant, optical primer assembly and flash tube assembly.

FIG. 4b depicts the complete assembly from FIG. 3b complete with propellant 4-013 and a projectile 4-014 in place.

For fabrication, assembly and transportation, all energetic materials will be external to the optical igniter assembly. The separation of the energetics from the optical igniter assembly allows safe physical assembly and unrestricted commercial transportation of the optical igniter assembly. Where a separate igniter compound (s) is needed, the flashtube with all energetics will be coupled to the optical igniter assembly within a controlled ammunition assembly facility.

Laser Diode Mounting

The optical primer assembly shown in the previous figures is an artistic representation with the laser diode and microelectronics represented by exemplary complementary shapes. However, mounting of currently available laser diodes on microelectronics presents additional challenges due to their design and dimensions, While most available laser diodes are designed such that their optical energy output is parallel to their conductive mounting surfaces such as a high power fabri parot edge emitter laser diode, in embodiments of the optical primer assembly, the locations of the energetic material and microelectronics within the primer cup dictate the use of a laser diode with an output perpendicular to the printed circuit board on which it is mounted.

Commercially available laser diodes are manufactured with a front and rear face having a thickness that is a small fraction of its length and width and with conductive connections on a top face and a bottom face. Conventional methods of mounting such devices involve surface soldering one conductive surface of the device to a horizontal conductive substrate and wire bonding the opposite conductive surface to a parallel horizontal conductor. This mounting method results in a laser output parallel to the printed circuit board.

However, even if a laser diode with an output perpendicular to its conductive surfaces were available, wire bonding is not an ideal solution. Techniques that involve wire bonding require further packaging to protect the delicate wire bonds from handling and the environment. Wire bonding is also a time consuming process since only one device can be bonded by a wire bonding machine at a given time. This tends to increase manufacturing cost.

Alternatively, a second conductive substrate can be soldered thereby producing a sandwich that provides both a thermal and electrical conductive path for each laser chip surface. Additionally, the resulting assembly, as in the previous wire bonded case, remains unsuitable for conventional surface mount techniques.

Figure 5:
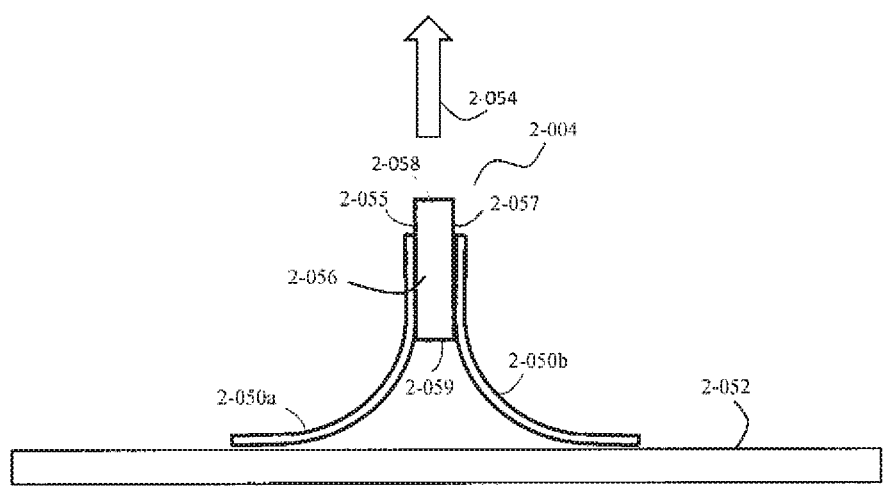
FIG. 5 is a side view of an optical source mounted on a printed circuit board, in accordance with one embodiment.

FIG. 5 depicts a laser diode mounted on a printed circuit board, in accordance with an embodiment of the invention. The embodiment shown in FIG. 5 is a further refinement of the gross geometric representation laser diode 2-004 and microelectronics 2-005 shown in FIG. 2A.

The laser diode 2-004 is mounted to a printed circuit board (PCB) 2-052 of the microelectronics assembly 2-005 utilizing flexible contact arms 2-050 such that its optical output 2-054 is directed perpendicularly away from the printed circuit board and towards the energetic material. The PCB 2-052 additionally serves as an insulator to insure a fixed electrical path. The flexible contact arms 2-050 are soldered to the PCB 2-052, as well as the microelectronics 2-005. Electrical connections to the conductive button 1-003 and primer wall complete the electrical assembly.

In the view shown in FIG. 5, a left face 2-056 of the laser diode 2-004 is visible as indicated. A back face 2-059 is parallel to and faces the printed circuit board 2-052. The front face 2-058 of the laser diode 2-004, the face from which the optical output 2-054 emits, is parallel to and faces away from the printed circuit board 2-052 surface and toward the energetic material.

A top face 2-055 and a bottom face 2-057 of the laser diode 2-004 each comprises conductive surfaces for facilitating electrical connections with the diode. The laser diode 2-004 is physically supported by a first flexible contact arm 2-050a soldered to the top face 2-055 and a second flexible contact arm 2-050b soldered to the bottom face 2-057 of the laser diode 2-004.

Each of the flexible contact arms 2-050 are physically connected to the PCB 2-052 thereby supporting the laser diode 2-004 on the printed circuit board 2-052. A circuit contact area of the flexible contact arm is attached to the printed circuit board 2-052 by one or more solder SMT points thereby providing a physical connection to support the laser diode 2-004 in space and provide electrical power needed to operate the laser diode 2-004.

The addition of an adhesive material may be required if undue mechanical stress is transmitted to the laser diode 2-004 during handling or assembly via the flexible contact arms 2-050. Such stress would cause the delicate material of the laser diode 2-004 to fracture and fail.

The laser contact area of the flexible contact arm is oriented perpendicularly to the board contact area, thereby providing the ninety degree change in direction required to direct the optical output 2-054 at the energetic material. While throughout the application, the laser diode output 2-054 is referred to as being perpendicular to the printed circuit board 2-052, it is understood that this term refers to the output 2-054 being in a general perpendicular orientation and includes angles greater than forty-five degrees and less than one hundred thirty five degrees from the printed circuit board 2-052 provided that the optical output 2-054 is at an angle which will allow the laser diode 2-004 to ignite the energetic material.

Advantageously, the flexible contact arms 2-050 act as a spring between the printed circuit board 2-052 and the laser thereby providing a reactive force in the direction of the energetic material. As such, the laser may be brought into contact with the energetic material thereby increasing the probability of successful ignition while not inducing potentially harmful stresses on the laser diode 2-004, printed circuit board 2-052 or contacts.

Figure 6:
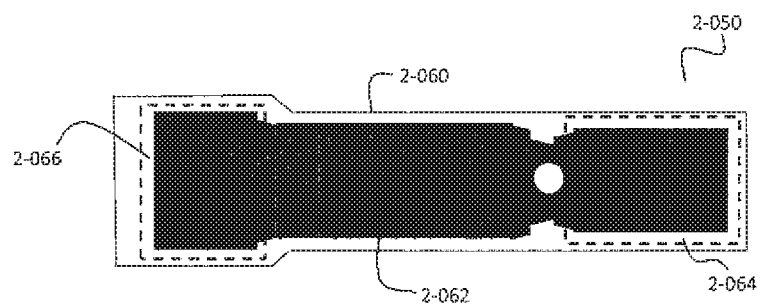
FIG. 6 is a flexible contact arm for mounting an optical source on a printed circuit board, in accordance with one embodiment.

FIG. 6 depicts a flexible contact arm, in accordance with an illustrative embodiment of the invention. In addition to physically supporting the laser diode 2-004 in space, the flexible contact arms 2-050 each provide an electrical connection from the laser diode 2-004 to the printed circuit board 2-052.

Each of the first flexible contact arm 2-050a and the second flexible contact arm 2-050b comprises a conductive tab 2-060 adhered to a flexible support 2-062. The conductive tab 2-060 comprises a laser contact area 2-064 for facilitating an electrical connection with the laser diode 2-004 and a board contact area 2-066 for facilitating an electrical connection with the printed circuit board 2-052.

In an embodiment, the conductive tab 2-060 is formed of a rolled and annealed copper layer of a desired width and thickness. However, the conductive tab 2-060 material is not limited to rolled and annealed copper. In other embodiments, the conductive tab 2-060 may be formed from sufficiently thin Beryllium Copper alloy any other material suitable for soldering and conducting an electric charge.

The non-conductive flexible support 2-062 provides a support substrate for the conductive material while also providing flexibility which allows the arm to be bent with respect to the two contact surfaces. For example, in an embodiment, the flexible support 2-062 is a polyimide. However, the flexible support 2-062 is not limited to polymide. In other embodiments, the flexible support 2-062 may be solid Beryllium Copper alloy that is sufficiently thin as to be flexible without imparting undue mechanical stress to the laser diode 2-004. In such a case the need for a support substrate is eliminated as long as there is sufficient electrical clearance between the two contact arms 2-050 of the laser.

In such an embodiment, the flexible contact arm may be fabricated as a continuous roll with each conductive tab 2-060 held in place by the flexible support 2-062. Manufacture of rolls utilizing copper clad flexible substrates could utilize traditional printed circuit board 2-052 technology methods of etching and routing. Manufacture of rolls utilizing Beryllium Copper could utilize traditional sheet metal stamping methods. Additionally, metal stamping may be utilized to produce a more cost effective contact arm for mass production. As part of a mounting process, such rolls could have solder paste continuously deposited using standard SMT equipment.

In another embodiment, the flexible contact arm 2-050 is composed solely of an integral unit of copper sheet material and does not comprise the flexible support 2-062 substrate. The copper sheet material of a thickness and width to provide the required amount of flexibility to the flexible contact arm. Advantageously, a flexible contact arm 2-050 comprised solely of copper reduces the material cost of the arm 2-050 as compared to a flexible contact arm 2-050 comprising polyamide or Beryllium Copper. Copper material may be stamped to further reduce cost as compared to polyimide which must be etched and laser cut during manufacture.

Additionally, a flexible contact arm 2-050 solely formed of copper or Beryllium Copper material allows for the addition of copper heat sink material to each side of the laser contact area 2-064. In applications where heat management is a concern, such heat sinks would serve as thermal management.

Alternatively, in another embodiment, thermal management is performed by a flexible contact arm 2-050 comprising double sided copper. The flexible contact arm 2-050 comprises thermally plated conductive holes plated through the polyamide substrate in the laser contact area 2-064 thereby providing a surface to solder a copper heatsink to the outside of the flex contact. Such a copper heatsink would serve as thermal management.

Figure 7:
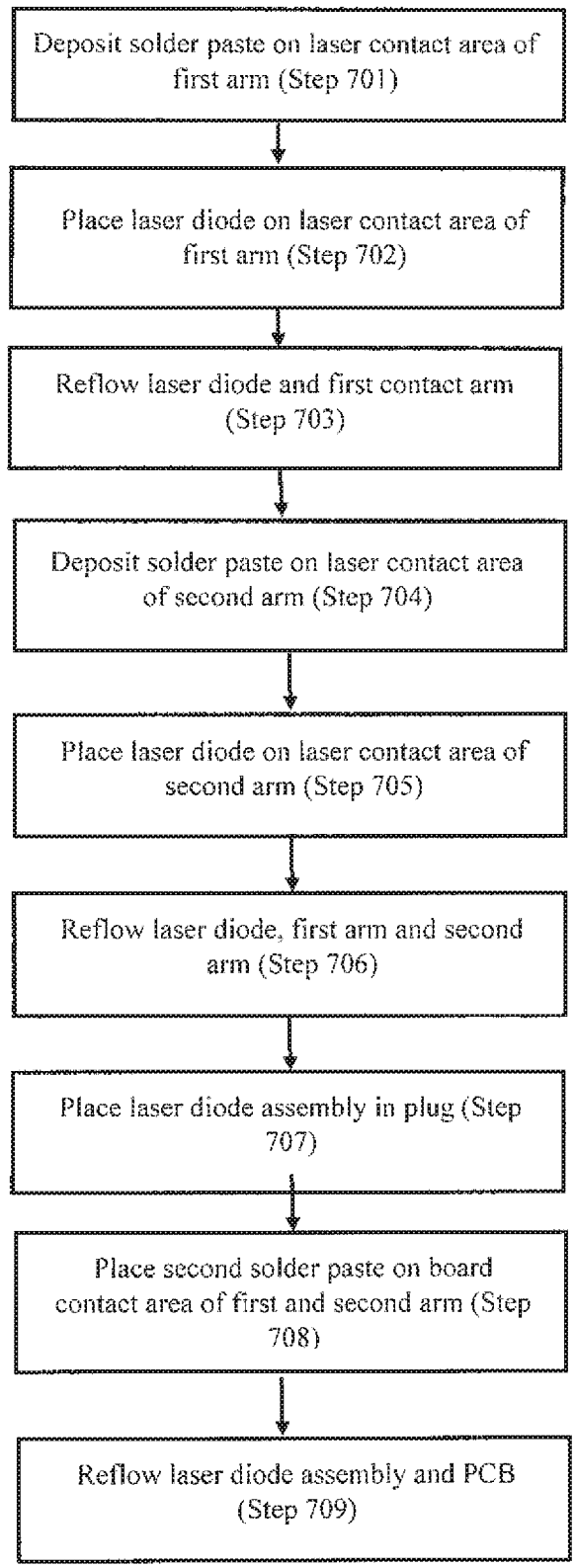
FIG. 7 is a flowchart detailing a method for mounting a laser diode in accordance with an illustrative embodiment of the invention.

FIG. 7 is a flowchart detailing a method for mounting a laser diode in accordance with an illustrative embodiment of the invention. The method detailed in FIG. 7 is a general method and as such the exact process flow may be tailored for the process method (i.e. batch vs continuous) and flexible materials selected (i.e. copper clad polyamide vs Beryllium Copper).

In step 701, solder paste is deposited at the laser contact portion of a first flexible contact arm 2-050*a*. The method for applying the paste will depend on the production flow. Batch flows could utilize traditional solder paste printing methods while continuous production flows would be more suited to a direct solder paste deposit method.

In step 702, a first conductive surface of a laser diode 2-004 is placed on the deposited solder paste such that the output 2-054 of the laser is directed parallel to a longitudinal axis of the flexible contact arm 2-050. This step may be accomplished with traditional SMT pick and place equipment. In such an embodiment, prior to depositing the solder paste, the laser diode 2-004 would have been packaged in a media friendly to such equipment such as traditional 'tape and reel'.

In step 703, the laser diode 2-004 and first flexible contact arm 2-050*a* are reflowed in an SMT convection reflow oven.

In step 704, solder paste is deposited at the laser contact area of the second flexible contact arm 2-050*b*.

In step 705, a second conductive face of the laser diode 2-004 is placed on the deposited solder paste such that the second flexible contact arm 2-050*b* is diametrically opposite that of the first flexible contact arm 2-050*a*.

In step 706, the first flexible contact arm 2-050*a*, second flexible contact arm 2-050*b* and the laser diode 2-004 is reflowed in an SMT convection reflow oven.

Alternatively, steps 701 and 704 could be combined into one operation followed by steps 702 and 705. In this case the operation would be completed by one reflow (step 703) and the need for step 704 and 706 eliminated In step 707, the laser diode assembly is placed in a plug such that the circuit contact areas of the first flexible contact arm 2-050*a* contact and the second flexible contact arm 2-050*b* contact are perpendicular with respect to their respective laser contact areas. This step involves forming the two contact arms 2-050 by bending the contact points at the opposite end of the laser. The design of the plug could help facilitate this operation. In this embodiment of the process flow, the plug is a part of the completed assembly and thus forms an intermediate component that could be placed immediately or packaged and supplied to a downstream assembly process. The plug is composed of a material which may withstand the environment endured during a reflow process, such as a silicone material.

Alternatively, step 707 may be skipped altogether and the manufacturer may directly solder the assembly to the printed circuit board 2-052. In this embodiment of the process flow, the need for an intermediate plug would be eliminated; however, special tooling would be developed to form the leads of the laser for SMT soldering as in step 707.

In step 708, a second type of solder paste is placed on the laser contact areas of the printed circuit board 2-052. The second solder paste type used on the printed circuit board 2-052 has a lower reflow temperature than the first solder paste type used on the laser. This is done to ensure the integrity of the solder connections of the laser diode 2-004 during an additional reflow process needed for final assembly.

In step 709, the laser diode assembly with printed circuit board 2-052 is placed in an SMT convection reflow oven at a temperature lower than the reflow temperature of the first solder paste.

Pressure Sensitive Electrical Contact Pad

Referring back to FIG. 2A, there is a known conductive path running from the conductive button 1-003 through the laser diode 2-004 and terminating at the brass primer cup 1-001. There is a risk that a voltage source with sufficient current, such as from an electro-static discharge (ESD) or a personal electro-static discharge (PESD), may be unintentionally passed through the laser diode 2-004 thereby resulting in damage to the laser diode 2-004 or unintentional detonation of the primer. By providing a pressure sensitive electrical pad 2-080 over the conductive button 1-003, ESD risks may be mitigated due to isolation of the conductive button 1-003 via an air gap and by allowing static charge to dissipate to the exterior of the ammunition case.

The pressure sensitive electrical pad 2-080 isolates the laser diode 2-004 from external firing circuitry thereby alleviating concerns over the electrical environment. Ordinance and other devices that contain Electro-Explosive Devices (EED) must function in their operational Electromagnetic Environment (EME) without inadvertent actuation. To prevent the susceptibility of EEDs to radiated or conducted electromagnetic energy, Hazards of Electromagnetic Radiation to Ordnance (HERO) limits may be imposed. To ensure that the systems achieve these limits, HERO tests are conducted which classify the ordnance's susceptibility to electromagnetic radiation. Isolating the laser diode 2-004 and providing and allowing for dissipation pathway for static charge should allow the ordnance to pass such tests.

Figure 8:
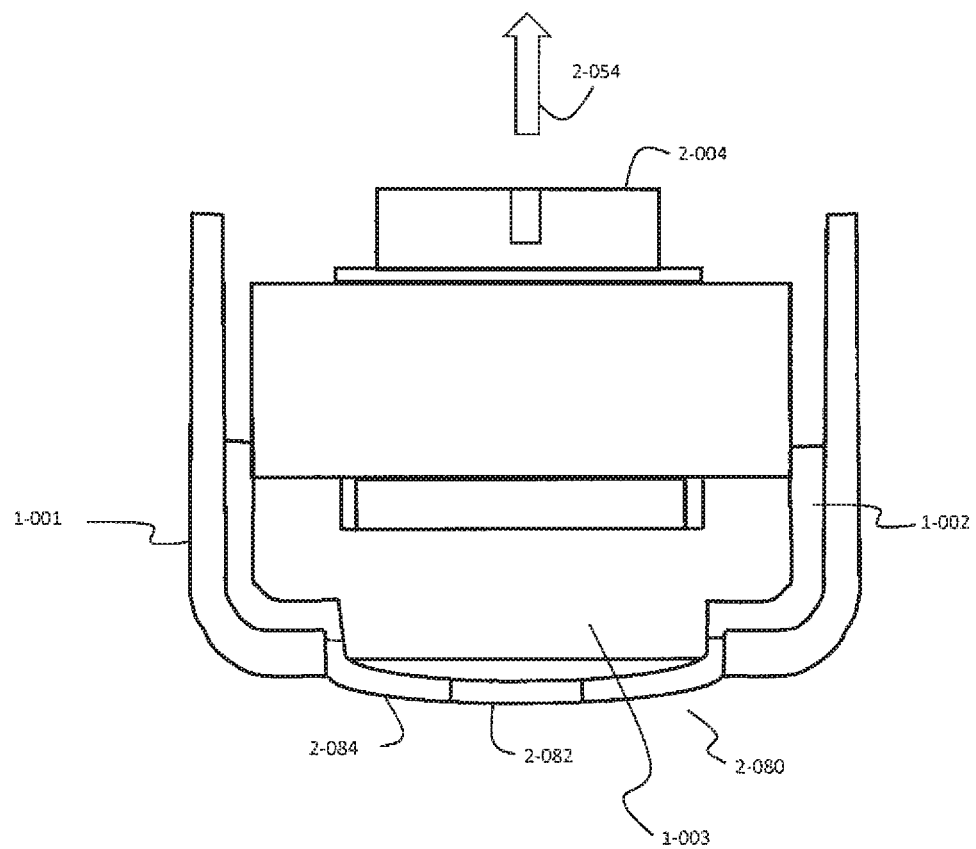
FIG. 8 is a sectional perspective view of a diode laser assembly as proposed mounted within the confines of a primer cup with a tactile button, in accordance with one embodiment of the invention.

FIG. 8 is a sectional perspective view of a diode laser assembly as proposed mounted within the confines of a primer cup 1-001 with a tactile button, in accordance with one embodiment of the invention.

The primer cup 1-001 comprises a pressure sensitive electrical contact pad 2-080, also referred to as a tactile button 2-080, positioned over the conductive button 1-003 of the primer cup 1-001. The pressure sensitive electrical contact pad 2-080 is a dome shaped tactile button sized and dimensioned to fit in an opening in the bottom of the brass primer cup 1-001 and is in contact with an insulating layer 1-002 within the primer cup 1-001. The pressure sensitive electrical contact pad 2-080 comprises a conductive portion 2-082 mounted in a dielectric material 2-084 with a defined resistance. In an embodiment, the conductive portion 2-082 is located in the center of the pad 2-080 and is formed from a conductive metallic material. In an embodiment, the semi-dielectric material is a polymer material.

Figure 9:
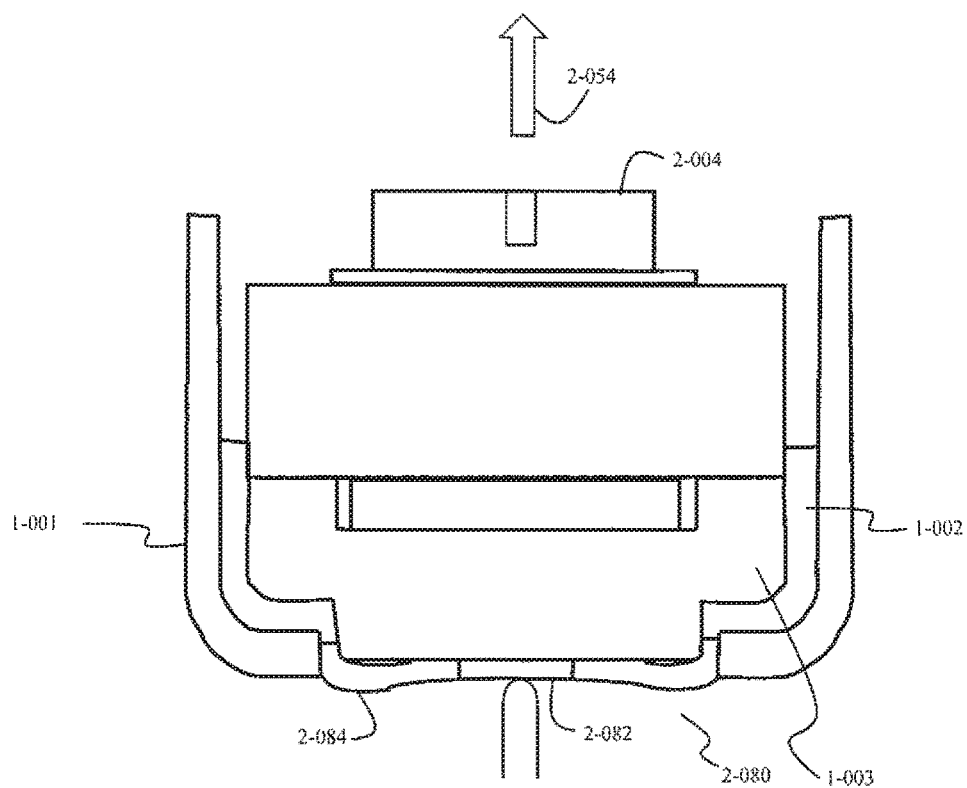
FIG. 9 is a sectional perspective view of a diode laser assembly as proposed mounted within the confines of a primer cup with a tactile button in a depressed state, in accordance with one embodiment of the invention.

FIG. 9 is a sectional perspective view of a diode laser assembly mounted within the confines of a primer cup 1-001 with a tactile button in a depressed state, in accordance with one embodiment of the invention. In operation, when the pressure sensitive electrical pad 2-080 is in a depressed state (i.e. engaged), the center conductive portion 2-082 is in direct physical contact with the conductive button 1-003 thereby creating electric contact between external electrical contacts located in the breech of the gun tube and internal electrical contacts such as the conductive button 1-003. Accordingly, the laser diode 2-004 may receive power from an external electric source to initiate ignition of the primer.

When the pressure sensitive electrical pad 2-080 is in a raised state, there is no physical contact between the conductive portion 2-082 and conductive button 1-003. Accordingly, the circuit is open and an air gap insulator is formed in the area between the pressure sensitive electrical pad 2-080 and the conductive button 1-003. Further, when the pad 2-080 is not depressed (i.e. non-engaged), the resistive polymer 2-084 allows for dissipation of static charge by conduction from the central portion of the sensor pad 2-080 to the exterior case. This reduces the risk from ESD and PESD conditions.

The risk of unintentional detonation of the primer is not limited to optically initiated ammunition cartridges as it is also a risk for current electrical based primers. As such, while the pressure sensitive electrical contact pad 2-080 is described throughout in reference to an optically initiated ammunition cartridge, it is not limited to optically initiated ammunition cartridges and may be employed on an electrically initiated ammunition cartridge such as those currently in use.

Advantageously, the pressure sensitive electrical pad 2-080 is compatible with existing electrically initiated ammunition and fire control systems and may be used as a retrofit solution to existing ammunition.

At this point, while we have discussed and described the invention using some specific examples, those skilled in the art will recognize that our teachings are not so limited. For example, the preferred embodiments of the invention have been provided for the purpose of explaining the principles of the invention and its practical application, thereby enabling others skilled in the art to understand the invention. Various embodiments and various modifications are contemplated. Accordingly, the invention should be only limited by the scope of the claims attached hereto.

We claim:

1. An optically initiated device comprising a case comprising an energetic charge, a booster charge embedded in said energetic charge and a primer assembly to initiate said energetic charge, said primer assembly comprising an optical source wherein the booster charge comprises a flashtube embedded in said energetic charge and wherein said optical source produces sufficient light fluence to ignite said primer, which ignited primer in turn ignites into said flashtube, and which ignited flashtube in turn ignites said energetic charge.

2. The optically initiated device of claim 1 wherein the energetic charge is a propellant charge.

3. The optically initiated device of claim 1 wherein the energetic charge is a pyrotechnic charge.

4. The optically initiated device of claim 1 wherein the optical source is selected from the group comprising: a light emitting diode, a laser diode and a VCSEL.

5. The optically initiated device of claim 1 wherein the primer assembly further comprises a metallic housing surrounding the optical source.

6. The optically initiated device of claim 5 wherein the case is a metallic container.

* * * * *